United States Patent [19]
Moore, III et al.

[11] Patent Number: 5,271,142
[45] Date of Patent: Dec. 21, 1993

[54] METHOD FOR PRODUCING A SOUND-DAMPENED AUTOMOTIVE ENCLOSURE

[75] Inventors: Dan T. Moore, III; Austin W. Moore, both of Cleveland Heights, Ohio

[73] Assignee: Soundwich, Inc., Cleveland, Ohio

[21] Appl. No.: 983,269

[22] Filed: Nov. 30, 1992

Related U.S. Application Data

[63] Continuation of Ser. No. 697,802, May 9, 1991, abandoned.

[51] Int. Cl.⁵ .................. B21D 35/00; B21D 22/12
[52] U.S. Cl. .................... 29/469.5; 29/163.6; 29/169.5; 29/897.2; 72/350
[58] Field of Search ............. 29/163.6, 163.7, 169.5, 29/421.1, 432, 460, 506, 773, 469.5, 897.2; 72/347-351, 363, 379.2, 379.4; 181/204, 208; 428/34.1, 323, 425.8, 461; 524/418

[56] References Cited

U.S. PATENT DOCUMENTS

| | | |
|---|---|---|
| 200,727 | 2/1878 | James et al. |
| 3,052,021 | 9/1962 | Needham |
| 3,340,714 | 9/1967 | Pohl et al. |
| 3,489,242 | 1/1970 | Gladding et al. ........... 524/418 X |
| 4,315,971 | 2/1982 | Taylor et al. ........... 428/425.8 X |
| 4,440,337 | 4/1984 | Eckert |
| 4,472,955 | 9/1984 | Nakamura et al. ........... 72/347 X |
| 4,478,589 | 10/1984 | Takenaka et al. |
| 4,482,334 | 11/1984 | Ohtake et al. |
| 4,678,707 | 7/1987 | Shinozaki et al. ........... 428/323 |
| 4,851,271 | 7/1989 | Moore, III et al. ........... 428/461 X |

*Primary Examiner*—Mark Rosenbaum
*Assistant Examiner*—Peter Dungba Vo
*Attorney, Agent, or Firm*—Pearne, Gordon, McCoy & Granger

[57] ABSTRACT

A method for making a sound-dampened automotive enclosure, such as an oil pan, having a metal constraining layer, a metal housing layer, and a viscoelastic layer sandwiched therebetween. In a preferred embodiment, the constraining layer and viscoelastic layer are between the housing layer and the die while the housing layer is being drawn. This results in a very close and snug fit between the layers, leading to enhanced sound-dampening effectiveness. The article thus produced is also disclosed.

29 Claims, 5 Drawing Sheets

METHOD FOR PRODUCING A SOUND-DAMPENED AUTOMOTIVE ENCLOSURE

This is a continuation of application Ser. No. 07/697,802, filed May 9, 1991, now abandoned.

BACKGROUND OF THE INVENTION

The present invention relates to a novel method for producing sheet metal automotive power train component enclosures which are designed to reduce structure-borne noise by increasing the internal damping of the enclosure. The invention applies specifically to sheet metal oil pans, valve covers, timing chain covers, air cleaner covers, transmission side covers, drive shaft components, and disk brake rotor covers, but can be used for any sheet metal stamping or similar enclosure requiring damping.

DESCRIPTION OF RELATED ART

Typically, the component enclosures described above are made by either stamping sheet metal or by casting the components. In both cases, the component and/or enclosure is easily excited by the typical vibration that emanates from a power train system, and since they are made of materials that have very little internal damping, they have a tendency to radiate noise.

Methods for producing damped automotive enclosures include the following:

1. Covering the component with an elastomeric barrier. Typically, this includes a "spring layer" loosely attached to a limp mass. The noise radiating from the component is absorbed to some degree by the spring layer of the composite—typically, either a foam or fiber material—and is confined within the limp mass layer, which is typically a limp but heavy specific gravity rubber or elastomer. It is expensive and heavy, and creates corrosion problems by trapping moisture against the metal.

2. Forming the material from a laminated product composed of three continuous layers adhesively bonded together: two layers of steel with a viscoelastic damping layer sandwiched between. The viscoelastic layer often appears as a thin layer or membrane of pressure-sensitive adhesive. This composite is often referred to as "dead metal" or "laminated steel" and is produced by such companies as Antiphon Inc., 62 Omega Drive, Newark, Delaware 19713, and Prefinish Metals, Inc., Elk Grove Village, Illinois 60007.

3. A product having features similar to those produced by U.S. Pat. No. 4,851,271 to Dan T. Moore III et. al., the contents of which are incorporated herein by reference in their entirety.

As used herein with reference to metal, "drawing" means to stretch, "forming" means to bend, and "deforming" includes, but is not limited to, drawing and forming. In U.S. Pat. No. 4,851,271, an oil pan or other automotive component enclosure or automotive enclosure is prepared by drawing and forming an outer housing from a sheet of metal; forming a conforming constraining layer from sheet metal in a separate operation; disposing a cut out viscoelastic layer, which contains a blowing agent and which expands upon activation, between the constraining layer and the outer housing; spot welding the constraining layer onto the housing; and then painting and baking to complete the process of expanding the viscoelastic layer to fill the space between the two metal layers. This method utilizes a foamed plastic layer which is generally less effective at sound-dampening than some solid plastics. In addition, since the metal layers are stamped in different dies, there can be some dimensional non-conformity between the layers, creating empty spaces, voids, or excessive variation in the distance between the two layers.

U. S. Pat. No. 3,489,242 to Gladding et. al. teaches, inter alia, an acoustic damping structure composed of substrate adhered to a viscoelastic polymer such as a polyurethane elastomer, with at least 35% by volume of a filler having a specific gravity of at least 2.5 and a maximum dimension of 0.1 millimeter. The composition of this patent does not have an outer constraining layer and is intended for use in "free layer", or limp mass, damping.

The present invention is concerned with a more cost-effective way for producing a damped stamping. Instead of having to combine two separate stampings with a visco-elastic layer in between, this invention teaches how to stamp both the outer and the inner metal layers with the visco-elastic layer in between simultaneously. Since the two sheet metal layers are stamped together, the fit is tighter, making it possible to eliminate the need for a blowing agent, and thereby creating better damping and hence reducing the radiated noise.

OBJECTS OF THE INVENTION

It is an object of the invention to provide a method for producing automotive component housings or enclosures having sound-dampening qualities and, in particular, having such qualities, under harsh conditions such as, for example, those that would exist in the interior of an oil pan used in an internal combustion or diesel engine.

Another object of the invention is to provide a simplified method for producing an oil pan or other housing or enclosure having excellent sound-damping qualities, the method requiring considerably less labor and expense than other methods heretofore used, and resulting in a product with very closely and accurately conforming layers in close engagement or contact or tolerance or parallelism with each other.

These and other objects and advantages of the invention will become apparent from the following description, drawings, and disclosure.

SUMMARY OF THE INVENTION

A method of producing a three-dimensional sound-dampening automotive enclosure having a metal housing layer, a metal constraining layer, and a viscoelastic layer disposed therebetween is provided. The method comprises the following steps. The metal housing layer, metal constraining layer, and viscoelastic layer are disposed in a press. The metal constraining layer is urged into deforming contact with the metal housing layer by means of the press while the viscoelastic layer is disposed between the two metal layers to deform at least a significant portion of at least one of the metal layers into a three-dimensional shape. A flange is provided on the enclosure, said flange being a single layer. This method produces a sound-dampened automotive enclosure wherein the metal constraining layer and the viscoelastic layer closely conform and complimentarily conform to the shape of the adjacent portions of the metal housing layer. The viscoelastic layer is in sufficient solid or physical contact with the two adjacent metal layers over a sufficient area to provide effective sound-dampening qualities. Preferably, a blowing agent is not utilized to ensure that the viscoelastic layer sufficiently contacts the two metal layers between which it is disposed and to ensure that the viscoelastic layer fills that space. The article thus produced is also disclosed.

DETAILED DESCRIPTION OF THE INVENTION

The method of the present invention will be described utilizing, as an example, an oil pan. However, the method of the present invention can also be used to make other automotive component- housings or containers or cavities or enclosures, including, but not limited to, valve covers, timing belt covers, and others. The enclosures are three-dimensional and can be pan-shaped, box-like, or other shapes. Three-dimensional means something which is not flat, and which has its portions significantly displaced out of its plane to form a shape such as a pan, bowl, box, etc. The enclosures are typically mounted on the engine or motor of the motor vehicle.

Figure 1:
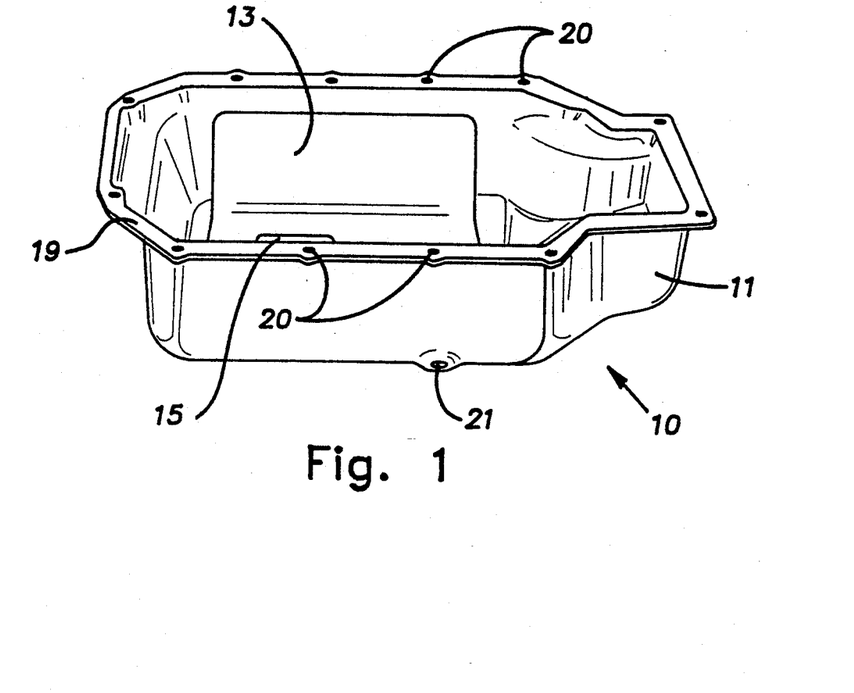
FIG. 1 shows a perspective view of an oil pan made in accordance with the invention, said oil pan having one metal constraining layer.

In FIG. 1 is shown an example of the typical geometry for a 4-cylinder sound-dampening oil pan 10 made in accordance with the invention. The oil pan in this example consists of an outer metal housing 11 which is typically sheet metal, a constraining layer 13 of sheet metal, and a viscoelastic dampening layer (not shown, but beneath layer 13). The viscoelastic layer is tightly sandwiched between the outer housing and the constraining layer. As can be seen in the embodiment of FIG. 1, the constraining layer comes substantially up the side of the housing. Suitable sheet metal materials for use with the invention include steel, particularly drawing-quality steel, and aluminum. The constraining layer is preferably steel, due to its lower cost. The outer housing is preferably drawing-quality steel. The viscoelastic layer has approximately the same size and shape as the corresponding overlapping or constraining layer 13, subject to cutouts, etc. The lateral and transverse dimensions of the viscoelastic layer are typically less than or equal to those of its corresponding constraining layer, and the lateral and transverse dimensions of the constraining layer (after it is formed) are less than those of the outer housing layer (after it is drawn and formed). As shown in FIG. 1, the metal constraining layer is spaced in from the majority of the edge or perimeter of the metal outer housing.

Although a wide variety of different viscoelastic polymeric compositions or, compounds could be used for the viscoelastic dampening layer, preferred materials include those disclosed in U. S. Pat. No. 4,851,271 and U. S. patent application Ser. No. 07/573,370, filed Aug. 27, 1990, preferably without blowing agents. The contents of U.S. Pat. No. 4,851,271 and U.S. patent application Ser. No. 07/573,370, filed Aug. 27, 1990 are incorporated herein by reference. Such compounds include those comprising from about 30% to about 70% by weight of at least one urethane polymer and from about 10% to about 30% by weight of a high molecular weight olefin polymer, and an effective amount of filler. The urethane polymer could be a polyester urethane derived from an aromatic diisocyanate and hydroxy-terminated polyester or a polyether urethane derived from an aromatic diisocyanate and hydroxy-terminated polyether. Normally these compounds will be made or formulated or compounded without blowing agents, although in some cases, as discussed hereinafter, blowing agents may be required. A flange or mounting flange 19, which is a single solid layer of metal, is located on the periphery of the oil pan and is provided with screw holes 20 for mounting the oil pan 10 to an engine block. The constraining layer 13 in FIG. 1 has a cutout 15. The oil pan also has a drain hole 21. The perimeter of the housing, largely or completely comprised of the flange, is devoid of a second layer or covering along at least a substantial portion of its extent. This substantial portion or flange provides an area for attachment to another body, such as the engine block.

Figure 2:
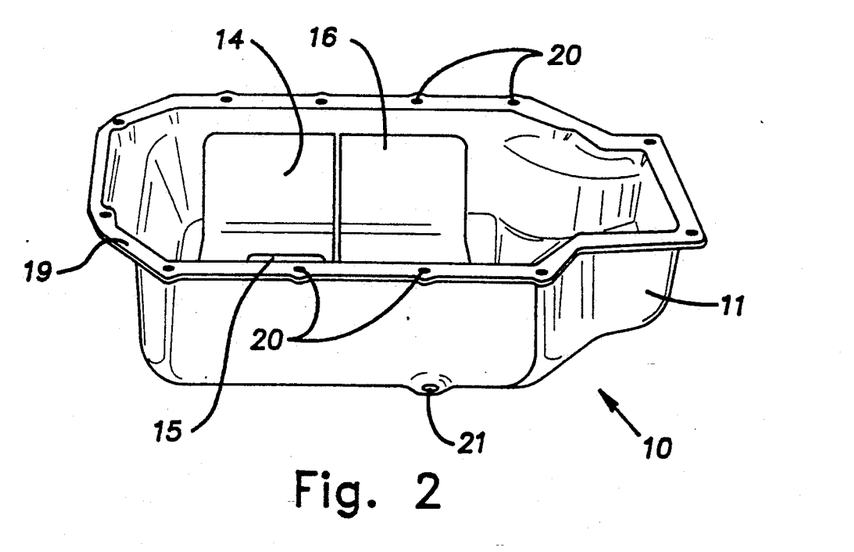
FIG. 2 shows a perspective view of an oil pan made in accordance with the invention, said oil pan having two metal constraining layers.

FIG. 2 shows an oil pan similar to the oil pan illustrated in FIG. 1, except that the oil pan in FIG. 2 has two metal constraining layers, a left half or portion 14 and a right half or portion 16, each covering a portion of the housing, whereas, the oil pan of FIG. 1 has a single constraining layer. In FIG. 2, there is a separate viscoelastic layer under each constraining layer. Multiple constraining and viscoelastic layers may be utilized where, for example, different sound frequencies need to be dampened at different locations, in which case the different viscoelastic layers could have different sound-dampening characteristics. Alternatively, one constraining layer could cover both a multiple or different viscoelastic layers.

Figure 5:
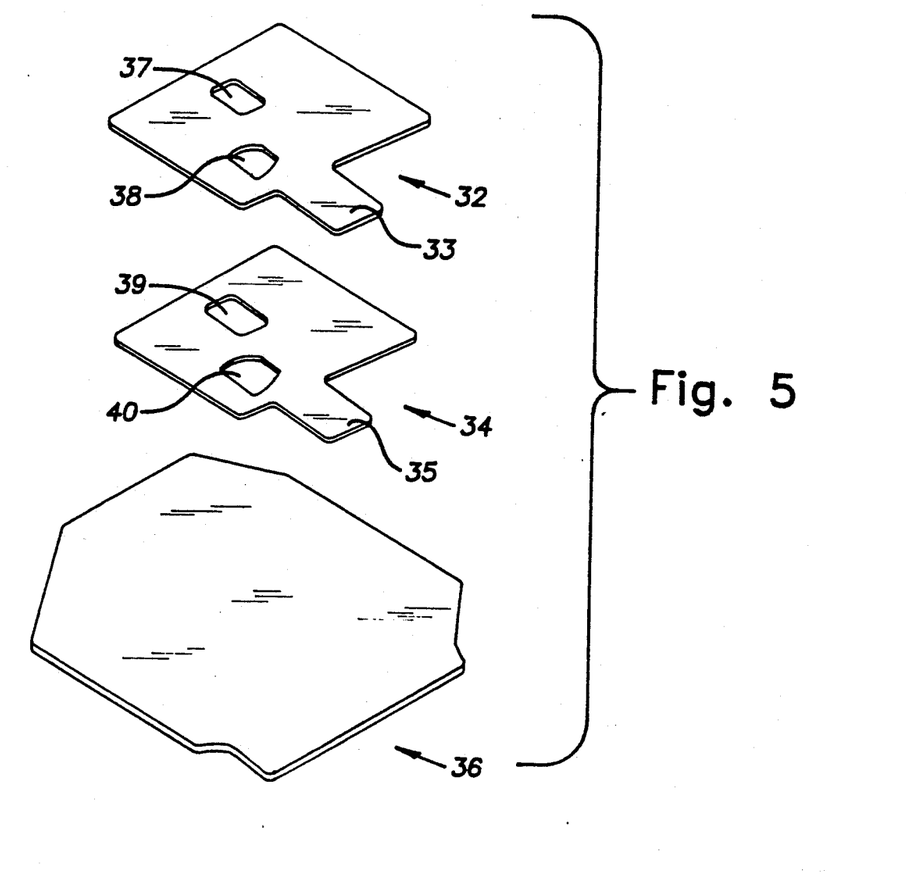
FIG. 5 shows an exploded schematic perspective of the individual components of the oil pan in FIG. 1 as they are aligned prior to the stamping operations.

FIG. 5 is an exploded perspective view illustrating an embodiment of the layered arrangement of the metal constraining layer blank 32, the viscoelastic layer blank 34, and the outer housing or main blank 36 prior to stamping. The three layers may be precut or blanked. They each have an outside edge or perimeter which defines a boundary. There may be apertures or holes inside the boundary. Cutouts 38 and 40 are provided in the constraining layer blank 32 and the matching viscoelastic layer blank 34, respectively, to accommodate installation of a drain hole such as indicated at 21 in FIG. 1. If required, a set of matching cutouts 37, 39 in the constraining layer blank 32, and the viscoelastic layer blank 34, respectively, can be provided to prevent excessive heat build-up in the oil pan during engine operation. Cutouts are generally not essential. They are provided where useful. The blanks can be cut to any configuration, as required. Projections, such as indicated at 33 and 35, can be provided. These projections can extend into portions of the enclosure, such as the right-hand side of an oil pan such as illustrated in FIG. 1, to dampen that part of the pan.

Each of the three layers or blanks is typically of a uniform or relatively uniform thickness. The shapes of the constraining sheet metal layers and viscoelastic layers as shown are for illustrative purposes only. The actual shapes, sizes, compositions, thicknesses, and locations of individual layers or pieces will depend on a variety of considerations unique to the particular application, such as the type of enclosure, the noise dampening characteristics desired at particular sites within the enclosure, the frequencies sought to be damped, the stiffness of the metal layers, temperature, weight, and heat transfer considerations. Thus, different enclosures can be individually "fine tuned." The constraining layer blank, viscoelastic layer blank, and main blank are not necessarily the same size before stamping. The first two may be larger or smaller than the third before stamping. The principal purpose of the constraining layer is to constrain the viscoelastic layer to provide sound-dampening. Typically, the constraining layer will at least cover the area covered by the viscoelastic layer. It is preferable to design the constraining layer blank so that when it is formed as hereinafter described, it is bent into simple curves and not compound curves. Compound curves are much harder to form; the metal may crease or wrinkle. Also, for particular applications, it may be desirable to have more than one constraining sheet metal layer and one corresponding viscoelastic layer. Multiple viscoelastic layers or pieces can be used with one constraining layer. If multiple viscoelastic layers are used, it may be desirable to make them from different types of polymer compositions to provide different 1) sound-dampening qualities, 2) resistances to environmental elements such as oils, detergents, salts, etc., 3) stiffness, 4) thermoconductivities, and/or 5) temperature resistances, at various locations within an automotive enclosure such as an oil pan. The automotive enclosure above has been shown with the constraining and viscoelastic layers inside the housing. Alternatively, in some applications it may be preferable to place these layers on the outside of the housing, although in these situations environmental elements, such as road salt, become more important.

An important feature of the present invention is that only those areas of the automotive enclosure which need to be sound-dampened are sound-dampened. The entire surface area of the metal housing is not sound-dampened. For one thing, the flange is not sound-dampened. Smaller plains or flat surfaces tend to resonate less. Stiffening or ribbing reduces noise. Thus, typically only the larger, flatter, unribbed, unstiffened areas of the enclosure tend to have to be dampened. In some cases, only a portion of each of certain walls of an enclosure will need to be sound-dampened in order to sufficiently sound-dampen the entire enclosure. In an oil pan, for instance, only certain portions of the internal surface of the pan will typically need to be sound-dampened with the constraining layer and the viscoelastic layer in order to provide sufficient sound-dampening. Thus, the present invention has distinct cost of material and heat retention advantages over the Antiphon or Prefinish Metals approach using laminated metal, where the entire enclosure, including the flange, has two metal layers and an adhesive layer therebetween. In addition, a laminated metal oil pan such as Antiphon of approximately equal steel thickness and/or approximately equal weight has a flange which is less stiff. This is because Antiphon's laminated metal, including the flange, has two layers of steel, each about 0.025 inches thick, while the metal housing layer of the present invention is only one layer and is typically and preferably about 0.044 inch thick before stamping, resulting in a flange of steel which is a single layer and about 0.044 inch thick. A solid layer of steel 0.044 inch thick is typically stiffer than an adhesive laminate of two layers of steel, each 0.025 inch thick. Thus the flange of the present invention is stiffer than the Antiphon flange and thus tends to resonate less.

The metal housing blank of the present invention is preferably drawing quality steel and 0.030 to 0.060 inch thick, preferably about 0.044 inch thick, before stamping. The metal constraining layer is preferably steel and 0.010 to 0.032 inch thick, more preferably about 0.020 inch thick, before stamping. The viscoelastic layer is preferably 0.005 to 0.030 inch thick, and, more preferably, about 0.008 to about 0.020 inch thick, and, most preferably, about 0.010 inch thick, before stamping, in the typical application.

Figure 6:
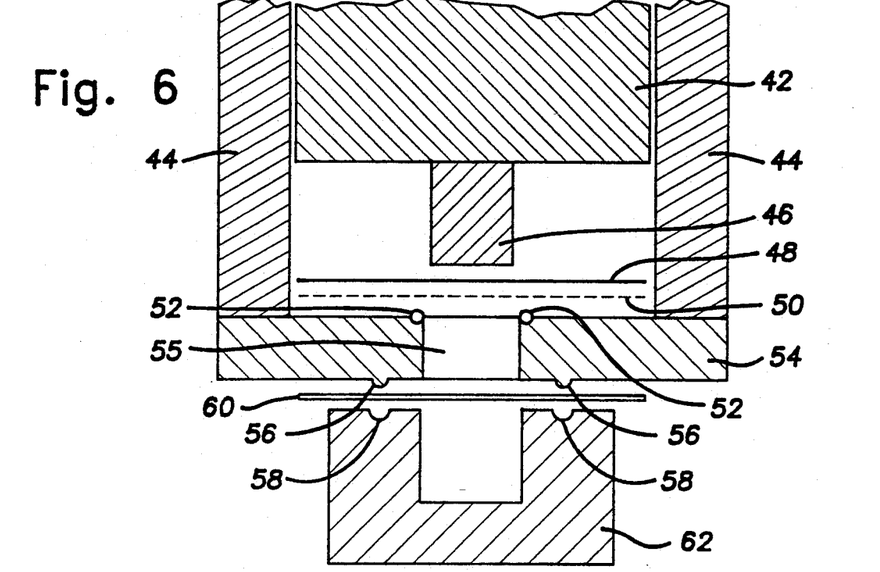
FIG. 6 shows a cross section of a press with blanks therein prior to initiation of a stamping operation.
Figure 7:
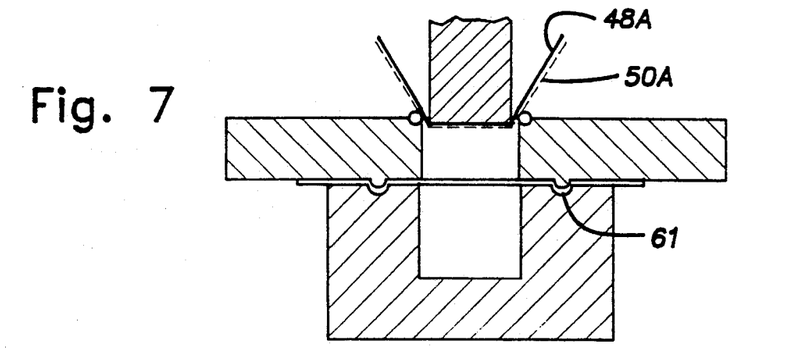
FIG. 7 shows a cross section of the blanks and press shown in FIG. 6 with the metal constraining layer and viscoelastic compound layer beginning to be formed.

A preferred embodiment of the invention is illustrated in FIGS. 6–9, wherein drawing and forming techniques are utilized in conjunction with matched metal dies to permanently and inelastically deform the metal layers. This method has the advantage of using conventionally available tooling techniques, e.g., it can be run on a conventional double-acting mechanical or hydraulic press, and if it is used on a mechanical press, can yield faster cycle times. With reference to FIG. 6, the housing or main blank 60 to be deformed into the enclosure such as an oil pan is placed between the draw ring 54 and the female die 62. The constraining layer blank 48, which may be combined with the viscoelastic layer blank 50 as hereinafter described, is placed in a fixtured location between the draw ring 54 and the male die 46. As the press cycles, the outer ram 44 closes, closing the draw ring 54 tightly around the main blank 60 as seen in FIG. 7. With reference to FIGS. 6 and 7, the draw beads 56 squeeze the main blank 60 against the female die 62 utilizing draw bead receiving cavities 58, with the proper pressure to allow the appropriate amount of slippage of the metal through the draw bead as the main blank is being drawn. A second set of draw beads may be added, if necessary. After the outer ram 44 is fully engaged, the inner ram 42 with the male die 46 presses downward, forming the constraining layer 48, 48A, and the viscoelastic layer 50, 50A, in the opening 55 (which may be loosely-fitting) in the draw ring 54. Preferably, the carves being formed are simple, not compound, curves. Optionally, rollers 52 may be employed to assist in the forming process. Rollers would be useful to prevent or minimize tearing and/or abrading of the viscoelastic layer and/or twisting or removal of tabs at this stage of the process. The rollers would have to be comparatively heavy. They would probably be no more than about ⅛ inch in diameter.

Figure 8:
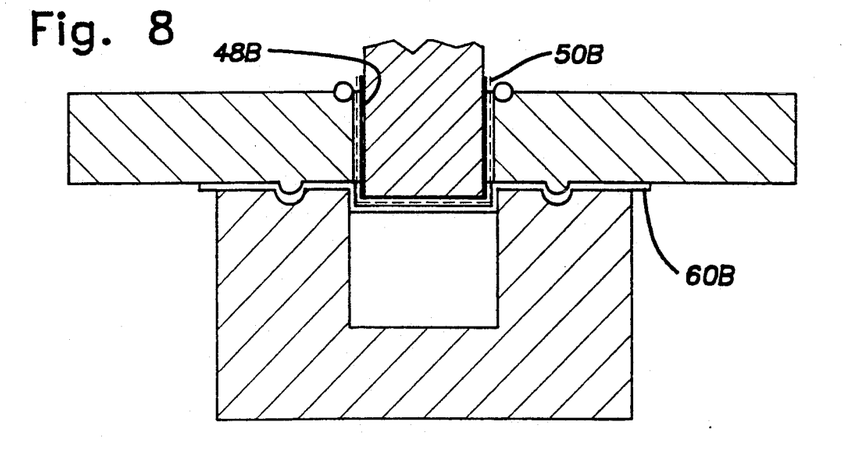
FIG. 8 shows a cross section of the blanks and press shown in FIGS. 6 and 7 at a further stage of the stamping operation.
Figure 9:
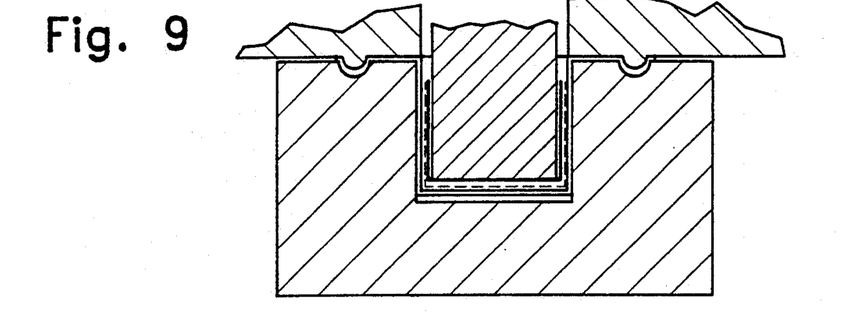
FIG. 9 shows a cross section of the blanks and press shown in FIGS. 6, 7, and 8 at the conclusion of a stamping operation.

With reference to FIG. 8, as the male die 46 passes through the opening 55 in the draw ring, the constraining layer blank 48B and the viscoelastic layer blank 50B are pressed against the main blank 60B by the male die 46 and the drawing process of the main blank begins. The constraining layer blank is now in deforming contact with the main blank. As used herein and in the claims, deforming contact includes the situation where one layer is being urged or pushed or pressed against another layer, although a third layer is disposed between the first two layers and prevents actual physical contact therebetween. The draw beads 56 are adjusted so that the main blank is pulled past the ring evenly as much as possible, elongating and drawing the metal or steel of the main blank uniformly so as not to create either wrinkles or tears. FIG. 9 illustrates the enclosure after the male die has reached the bottom of the female die. It can be seen that at least a significant, major, substantial portion of the constraining and housing layers have been deformed. A significant or major or substantial portion is more than is deformed with spot welding or other incidental deformation.

The purpose of having the constraining layer blank and the viscoelastic layer blank formed above the housing or main blank is threefold:

1. Since the constraining layer is being formed and is not being drawn, it allows the use of a constraining layer that reaches up higher on the side of the enclosure; it also allows the use of a constraining layer blank with lateral dimensions larger than those defined by the draw-beads;
2. It generally eliminates the need for a weld, since the parts can be positively located in the stamping press, rather than the two metal layers having to be welded in a previous step; and
3. It makes it possible to only have the main blank passing through the draw bead. It may be possible to pull the constraining layer and viscoelastic layer through the draw bead, but typically this will not be done. It is difficult to control the drawing process when more than one layer of material is passing through the draw bead. If the viscoelastic layer does not have to be drawn through the draw bead, one can draw the main blank deeper or use thinner metal. If the constraining layer blank, prior to stamping, does not extend to the draw-beads, the method illustrated in FIG. 10 can also be used.

If the enclosure being produced is shallow, one strike or hit may be sufficient. If the enclosure must be deeply drawn, more than one draw will generally be required, perhaps 2 or 3 or more. These draws will generally be made in separate dies. Thus, the three layer assembly would be removed and placed in a separate die and rehit or restruck.

It is normally necessary after the drawing and forming operation to hit or stamp the assembly one or more times to form the flange area, pierce holes, including screw holes in the flange and the drain hole, and roll the edges of the surface that mates to the engine block or other surface. Flange and holes (such as in an oil pan) are stamped after the main blank is drawn and formed, to assure accurate size and location.

In an alternative embodiment, the viscoelastic layer can be placed or affixed on top of the main blank, and only the constraining layer will be formed through the draw ring. With regard to the embodiment illustrated in FIGS. 6-9, the constraining layer blank may be larger than the main blank initially, since the main blank will be stretched and the constraining layer blank will be formed only. However, when the stamping is complete, the main blank will have more surface area than the constraining layer.

Figure 3:
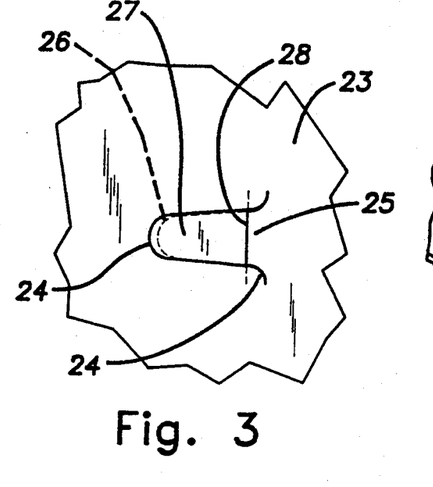
FIG. 3 shows a plan view of tab and slit means for attaching the viscoelastic layer to the metal constraining layer.

When the constraining layer blank and viscoelastic layer blank are positioned together above the draw ring or at other times, it is generally necessary or useful to attach or affix them together. This can be done by heat-bonding, gluing, cementing, stapling, using grommets, or other mechanical or adhesive means. They can also be affixed as illustrated in FIG. 3 by attaching the viscoelastic layer to spears or tabs stamped into the constraining layer. With reference to FIG. 3, a tab is stamped in the constraining layer 23 along a cutline 24. The base of the tab is indicated at 25 and the tip is indicated at 26, indicated with a broken line since it is hidden under the viscoelastic layer 27. A slit is cut in the viscoelastic layer at 28 and the tab inserted therethrough to hold or affix the viscoelastic layer 27 next to the constraining layer 23.

In an alternative embodiment, the constraining layer can be formed separately and then fitted around the male die 46. The viscoelastic layer can then be fitted around the constraining layer or otherwise positioned between the constraining layer and the main blank. Then the male die can draw the main blank in the female die with or without going through the opening 55 in the draw ring 54. In this step the constraining layer will be pressed against or towards or into the main blank as the main blank is drawn. Alternatively, the main blank can be drawn separately into a housing and left or placed in a female die such as indicated at 62 and then the constraining layer and viscoelastic layer can be formed directly in the previously drawn and formed housing.

Figure 10:
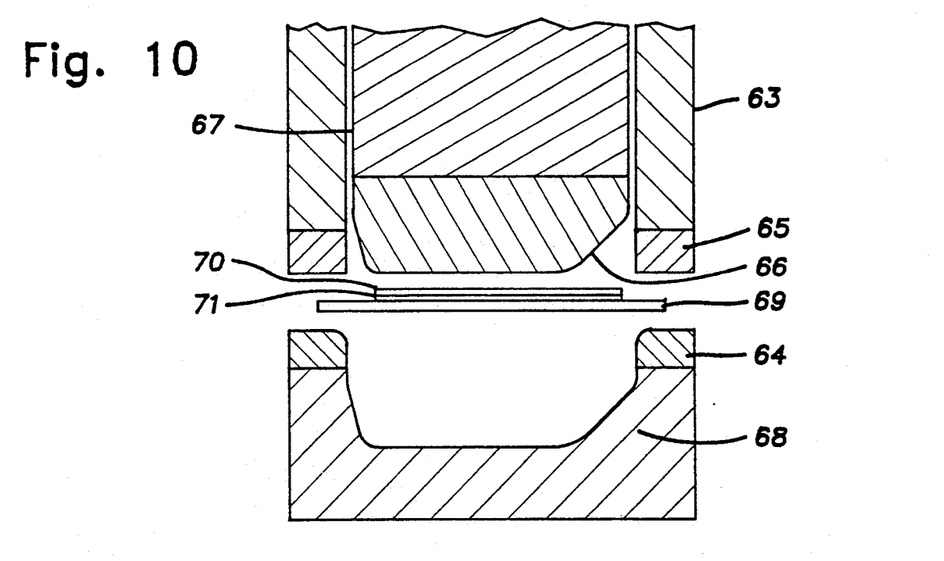
FIG. 10 shows a cross section of an assembly of blanks positioned in a matched-metal die press.

With reference to another embodiment of the invention shown in FIG. 10, there is shown a mechanical or hydraulic press with matched metal dies having a frame 63 to which is attached an upper blankholder 65. A male die 66 is attached to the ram 67. Disposed in the press beneath the male die is an assembly comprising the constraining layer 70, the viscoelastic layer 71, and the housing or main blank 69. The female die 68 has attached thereto bottom blankholder 64. Preferably, the three layers of the assembly are affixed or attached together. Mechanical or adhesive means can be employed, including spot welding, undercuts, undercut buttons, heating to make the viscoelastic layer sticky and adhesive to both metal surfaces, gluing, Tog-L-Loc from BTM Corp., Marysville, MI 48040, or Tox from Tox Corporation, Addison, IL 60101, the last two of which are similar to undercut buttons.

When an undercut or undercut button is used to hold two metal layers together, depressions are formed in the two sheets of metal, the depressions being wider at the bottom than they are at the top (or neck), thus holding the two sheets together.

If attaching by mechanical means such as spot welding, the fewer the number of points of attachment, typically the better, since there are fewer points for vibration to be transmitted from one metal layer to another. Only one spot weld is preferable. If spot welding, it is preferable to spot weld in a central location, and to make an emboss or depression or nub in the constraining layer, cut or blank a corresponding hole in the viscoelastic layer, and spot weld the constraining layer to the main blank.

With reference to FIG. 10, the frame 63 lowers the upper blankholder 65 until the perimeter or edge of the main blank 69 is engaged and retained and held securely between the upper and lower blankholders. It is preferable that the constraining layer 70 and the viscoelastic layer 71 not be engaged between the blankholders. In this way, the constraining and viscoelastic layers will be formed but not drawn, while the main blank will be drawn and formed. This requires that the lateral and transverse dimensions of the constraining and viscoelastic layers be shorter or smaller than those of the main blank and that their respective surface areas be smaller.

The ram 67 then forces the male die 66 towards the female die 68 until the stamping is completed. The main blank is drawn and formed, and the other two layers are formed, all in a single, mutual, simultaneous operation or stamping. The constraining layer is formed in a substantial manner while the metal housing layer is drawn, that is, more than an insignificant or insubstantial bending of the constraining layer occurs, such as in a spot weld; a major part of the constraining layer is bent or formed. A close-fitting final product is thus produced. The drawing may occur in one or more steps. If the enclosure being produced is shallow, one strike or hit may be sufficient. If the enclosure must be deeply drawn, more than one draw will generally be required, perhaps 2 or 3 or more. These draws will generally be made in separate dies. The assembly would be removed and placed in a separate die and rehit or restruck. The flange, which is formed only from the main blank, is thereafter flattened and is then trimmed and curled over. The holes are then punched in the flange and the drain hole added.

Since the pieces or layers are drawn and/or formed in a single stamping operation or at least to some extent at the same time, the layers fit together very closely. Particularly if spot welding is used to affix the two metal layers together and if there is no heating after stamping, the two metal layers may have sufficient residual stress between them after stamping to compress at least a portion of the viscoelastic layer therebetween, thereby enhancing the sound-dampening characteristics of the resulting product.

Figure 11:
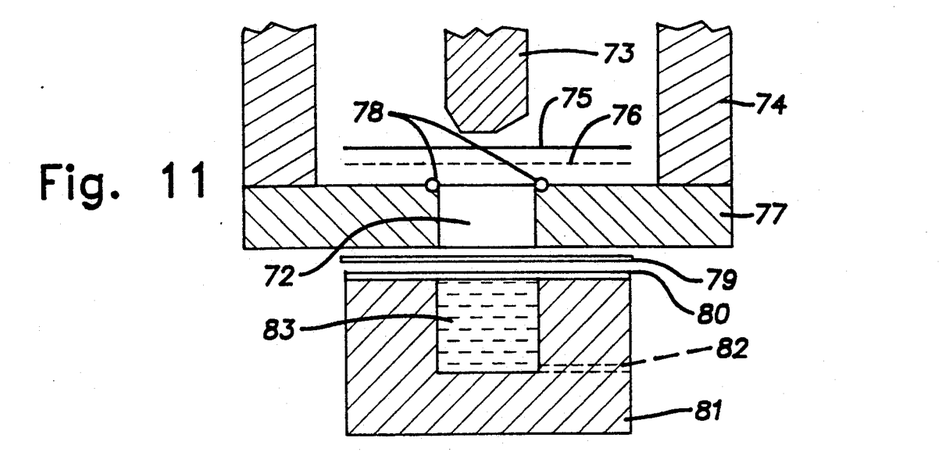
FIG. 11 shows a cross section of blanks placed with respect to the die surfaces of a press prior to initiation of a stamping operation, the press including a hydraulic counterpressure fluid-forming portion.
Figure 12:
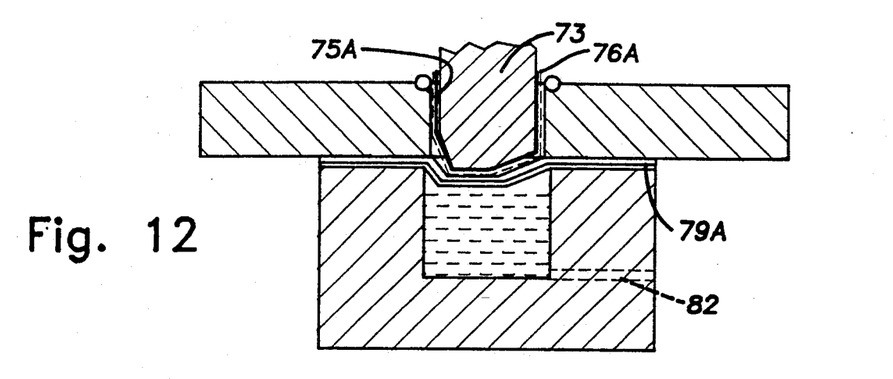
FIG. 12 shows a cross section of the blanks and press shown in FIG. 11 at an intermediate stage of the stamping operation.
Figure 13:
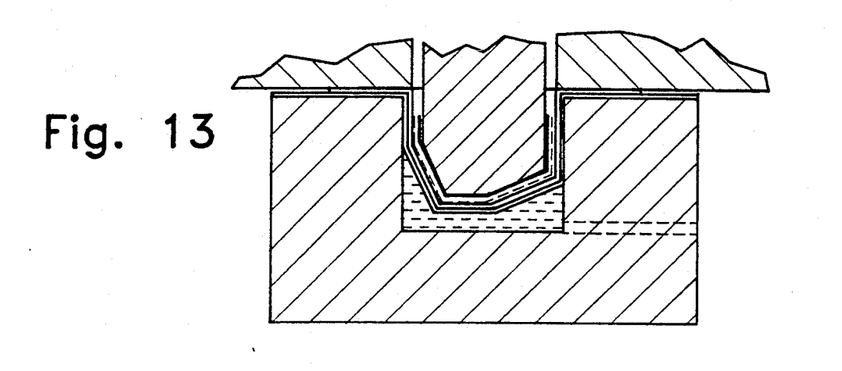
FIG. 13 shows a cross section of the blanks and press shown in FIGS. 11 and 12 at the conclusion of the stamping operation.

With reference to FIGS. 11-13, there is shown another embodiment of the invention. A double acting press very similar to that illustrated in FIG. 6 is shown. The principal difference is that the lower portion of the press shown in FIG. 11 is a hydraulic counterpressure fluid-forming press rather than a matched metal die press. The housing or main blank 79 to be deformed is placed between the draw ring 77 and the liquid die or chamber 81. The constraining layer blank 75 and the viscoelastic layer blank 76 are placed in a fixtured location between the draw ring 77 and the male die 73. The constraining layer blank and the viscoelastic layer blank may be attached or fixed to one another as described with respect to FIG. 6. As the press cycles, the outer ram 74 closes, closing the draw ring 77 tightly around the main blank 79 as seen in FIG. 12. The draw ring 77 firmly engages and restrains and holds the perimeter of the main blank against the flexible high strength diaphragm 80, which serves as a seal to prevent liquid from squirting out or leaking out from the liquid die or chamber 81 during the stamping operation. The liquid 83 is typically oil or water. After the outer ram 74 is fully engaged, the male die 73 presses downward, forming the constraining layer 75, 75A and the viscoelastic layer 76, 76A in the opening 72 in the draw ring 77, as illustrated in FIGS. 11 and 12. Optionally, rollers 78 may be employed to assist in the forming process. With reference to FIGS. 11 and, 12, as the male die 73 passes through the opening 72 in the draw ring 77, the constraining layer blank 75A and the viscoelastic layer blank 76A are pressed in deforming contact against the main blank 79A by the male die 73 and the drawing process of the main blank begins.

The flexible high strength diaphragm 80 extends horizontally over the entire surface of the liquid die 81. Alternatively, a gasket-type seal can be provided to prevent leakage. Referring to FIG. 12, the male die is forceably moved downward into the liquid die or chamber while the pressure in the chamber is increased by pumping liquid in through conduit 82. Conduit 82 is connected to a valve for purposes of regulating pressure. Hydraulic counterpressure causes the main blank 79A to extend in the direction opposite to that of the movement of the male die along the region between the die and the inner perimeter of the liquid chamber 81. In accordance with this method, the main blank is drawn directly in the liquid chamber with a pressure-regulated hydraulic cushion which forces the blank onto the downward acting male die and eliminates the need for a female die. FIG. 13 illustrates the arrangement of the layers after the male die has completed its downward acting stroke. The constraining layer blank and the viscoelastic layer blank formed in the manner described with respect to FIGS. 6-13 will closely conform to the shape of adjacent portions of the metal housing layer, and the viscoelastic layer will be capable of being adhered to sufficient areas of the two adjacent metal layers to be effective at sound-dampening.

Figure 14:
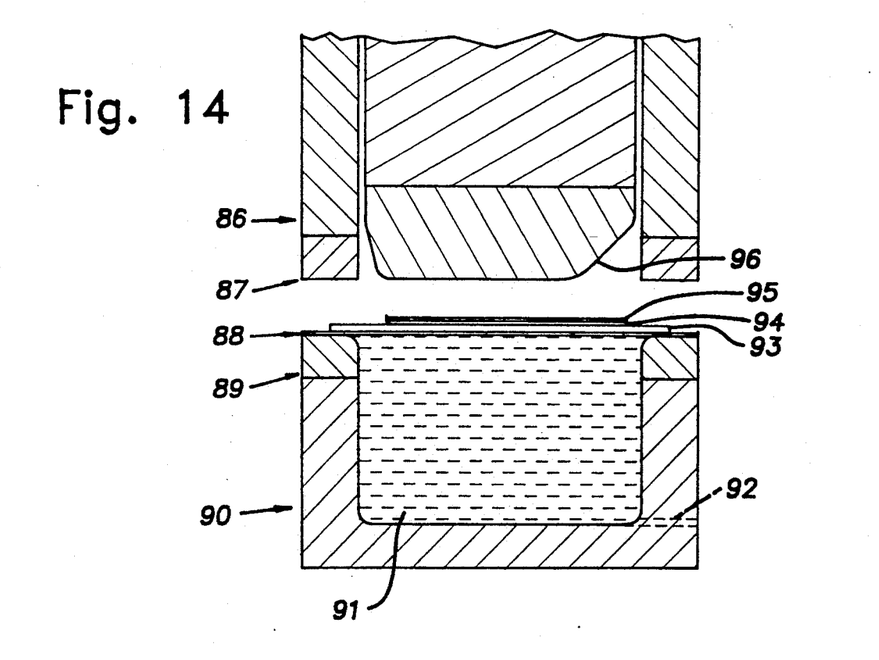
FIG. 14 shows a cross section of an assembly of blanks positioned in a hydraulic counterpressure fluid forming press prior to initiation of a stamping operation.

With reference to FIG. 14, there is shown a hydraulic counterpressure fluid forming press which forms an enclosure in much the same way as the matched metal die press illustrated in FIG. 10. The constraining layer 95, the viscoelastic layer 94 and the main blank 93 are disposed in the press and may be attached or fixed as described above. The frame 86 has attached thereto an upper blankholder 87. A male die is shown at 96. The three layer assembly is placed over a liquid die or chamber 90 having therein liquid 91 which is typically oil or water. A flexible high strength diaphragm 88 extends horizontally over the entire surface of the liquid chamber and over at least a portion of the lower blankholder 89. Alternatively, a gasket-type seal can be provided to prevent leakage. The periphery of the main blank 93 also extends over at least a portion of the lower blankholder 89.

The upper blankholder 87, which is attached to the frame 86, is lowered onto the outer periphery of the main blank 93. A sufficient force is transmitted downward to cause the upper and lower blankholders to retain the outer periphery of the main blank in a fixed position during the stamping operation. With regard, illustratively, to an oil pan, the constraining layer may occupy up to about 90% (particularly if it is a shallow draw) of the surface area of the main blank without being retained by the blankholders and without being subjected to drawing forces.

The male die 96 is forceably moved downward into the chamber while the pressure in the chamber is increased by pumping liquid in through conduit 92. Conduit 92 is connected to a valve for purposes of regulating pressure. Hydraulic counterpressure causes the main blank to extend in the direction opposite to that of the movement of the male die along the region between the male die and the blank-holders. The main blank 93 is drawn directly in the liquid chamber 90 with a pressure-regulated hydraulic cushion which forces the blank onto the downward acting male die and eliminates the need for a female die. At the same time, the constraining layer blank and the viscoelastic layer blank are formed in a single operation to achieve a very close fit between the constraining layer, the viscoelastic layer, and the housing or main blank. Since the hydraulic liquid die acts uniformly over the surface of the main blank, it is possible to draw a thinner blank more reliably and with more even wall thickness, which has the effect of reducing cost.

Figure 4:
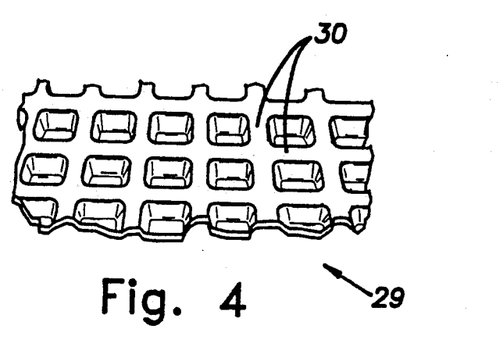
FIG. 4 shows a perspective view of a metal constraining layer with a pattern of ridges or crinkles or waffles.

It is useful if oil pans and other sound-dampening automotive enclosures made in accordance with the method of the present invention have constraining layers with approximately the same stiffness as the outer housing layer. If the constraining layer is less stiff than the outer housing, it will tend to deform when the outer housing begins to resinate, resulting in a diminished dampening effect. In accordance with another aspect of the invention, a thinner constraining layer can be utilized without diminished damping effect if it is suitably crinkled or creased or waffled or ridged to increase its stiffness to approximately equal that of the outer housing layer. With reference to FIG. 4, there is shown a portion of a waffled or crinkled constraining layer 29 having a pattern of ridges or raised portions 30. It is possible to crinkle or waffle a constraining layer in a separate operation using methods known in the art, before the subsequent stamping operation, and it is believed that such crinkles or waffles or ridges can be made to sufficiently survive the subsequent stamping operation in order to provide stiffness. Ridges or depressions or creases or raised portions can also be imparted after -the drawing and forming operation described above by overstriking the constraining layer while the outer housing layer is firmly held against a smooth or flat face to prevent it from receiving crinkles or waffles. In this case, the ridges may be projecting into the viscoelastic layer rather than away from it. Thus, one would coin the constraining layer into the viscoelastic layer, in one preferred embodiment getting a series of ridges or waffles approximately 0.0050 inch thick. Even this small amount will substantially enhance the stiffness of the constraining layer. Alternatively, the viscoelastic layer can be extruded with ridges. When stamping occurs, the ridges will read through and cause or form ridges in the adjacent constraining layer.

By urging the metal constraining layer into deforming contact with the metal housing layer with a die in a press while the viscoelastic layer is disposed between the two metal layers to deform at least a significant portion of at least one of the metal layers into a three-dimensional shape, a very close, snug, and uniform fit or engagement between the layers is achieved. Because of this, the resulting product has a constrained sound-dampening visco-elastic layer preferably of uniform or substantially or generally uniform thickness in very close contact with the housing and constraining sheet metal layers. For the most part, the viscoelastic layer of the finished product will not have a large deviation in thickness. The metal layers of the resulting product are consequently free of substantial or major deviation in spacing between each other. The degree of spacing between the metal layers is such that it will permit the viscoelastic layer to be adhered to or be in surface contact with or be touching sufficient surface area of the metal layers to be effective for sound-dampening, preferably without the use of a blowing agent or foaming agent. Preferably, the viscoelastic layer of the finished product (including heating, if any) does not have gross variation in thickness. As used in the claims, a layer does not have gross variation in thickness if the vast majority of the area of the layer does not vary in thickness by more than 200%, preferably 100%. Locations around corners, edges, bends, etc. can vary by more than these amounts. Alternatively, different parts of the viscoelastic layer may be intentionally of different thicknesses, as may be necessary for specific applications. Moreover, because of the perfect, or very close fit between layers which is achieved by this process, a greater variety of viscoelastic materials, including those which are thinner and those which do not require a foaming or blowing agent, can be used. In some cases, a blowing agent may still be necessary.

The constraining layer, since it is being formed, may have a tendency to spring back to its old shape and away from the housing layer. Typically, if because of the geometry of the part, the constraining layer springs back an excessive amount from the housing layer, it may be difficult to use a thin, generally uniform, layer of viscoelastic material and still achieve a filling of the void between the two metal layers. In this case, as little blowing agent as is possible is used.

Use of a blowing agent results in the visco-elastic layer having pores or porosity or being foam or foam-like. In the preferred embodiment of the invention, no blowing agent is used and the viscoelastic layer is compounded free of and devoid of a blowing agent and is consequently free of porosity resulting from the use thereof. The elimination of the blowing agent in the viscoelastic layer can generally provide better dampening and improved adhesion to metal.

The viscoelastic layer is a constrained layer, constrained between and held in place by the housing and the constraining layer. It is in full or nearly 100% or substantial contact with those two layers and is generally adhered to them. It is not intended to be loose between the two metal layers.

After the three layer enclosure is drawn and/or formed as described above, it is generally necessary to heat the enclosure to partially melt the viscoelastic layer so that it will flow into any gaps or voids or open spaces and stick to and adhere better to the two metal layers between which it is sandwiched. The process parameters will be fine-tuned and adjusted so that the viscoelastic layer will be in solid or physical contact with sufficient areas of the metal layers to provide effective sound-dampening of noise, vibration, etc. associated with or emanating from or produced by the enclosure. This provides improved sound-dampening. With most automotive enclosures such as oil pans, etc., this heating can or will be done automatically when the enclosure is painted and then placed in a bake oven where the temperature is typically 275°–400° F. After stamping, typically some of the viscoelastic layer will be under compression and some may not be touching the adjacent metal layer. Upon heating, the viscoelastic layer will flow to fill the open spaces and relieve the compressive forces.

If it is found that friction is insufficient to hold the three layers together after stamping and prior to baking as described above, a tackifier may be added to the viscoelastic composition to make the viscoelastic layer tackier so that it can help hold the metal layers together prior to baking. Alternatively, the polymer can be heated to make it tackier before or after stamping or the metal layers can be mechanically attached such as by spot welding (preferably after removal from the press) or by crimping with the Tox technique previously referenced.

In accordance with another aspect of the invention, and as illustrated in FIG. 2, different kinds of polymers can be utilized in different viscoelastic layers or pieces and these different viscoelastic layers or pieces can be positioned at different locations within the housing, to dampen different frequencies which may arise at different locations, to handle different temperatures at different locations, to provide different stiffness at different locations of the housing, or combinations thereof. An advantage of the present method over Antiphon and other laminated metal products, such as Prefinish Metals, Inc., is that heat retention within the housing, such as an oil pan, can be controlled by varying the extent to which the viscoelastic layer covers the inside or outside surface of the housing. Cutouts, such as indicated in FIGS. 1, 2, and 5, can be made in the viscoelastic layer and constraining layer to reduce heat retention. The assembled layers may also be heated prior to, during, and/or after the stamping operation to enhance adhesion.

As described above, if it is found that the layers are not close enough together after the stamping operation, the process may be modified by adding a blowing agent to the formulation of the viscoelastic layer. The blowing agent can be activated by heating after the stamping operation, thus foaming the viscoelastic layer and filling any voids which may exist between the two sheet metal layers. The necessary heat would generally be provided in the paint and bake cycle.

It is generally advantageous to fabricate automotive enclosures of the type disclosed herein with the sound-dampening material and constraining sheet metal layers fixed to the inside of the enclosure. One advantage, realized with oil pans, is that the constraining layer is protected from road salt. However, in accordance with another aspect of the invention, automotive enclosures can be fabricated with the viscoelastic layer or sound-dampening material and constraining layer on the outside of the enclosure using a stamping technique analogous to that illustrated in FIGS. 10 and 14 with the viscoelastic layer and constraining layer on the other side of the main blank.

The fluid forming techniques described above generally have less metal-thinning effect in the direction of the draw than conventional matched metal die techniques. With less metal-thinning, there tends to be fewer fractures and splitting.

While the invention has been shown and described with respect to particular embodiments thereof, this is for the purpose of illustration rather than limitation, and other variations and modifications of the specific embodiments herein shown and described will be apparent to those skilled in the art. Accordingly, the patent is not to be limited in scope and effect to the specific embodiments herein nor in any other way that is inconsistent with the extent to which the progress in the art has been advanced by the invention.

What is claimed is:

1. A method of producing a stamped three-dimensional sound-damped automotive enclosure having a metal housing layer, a metal constraining layer, and a viscoelastic layer disposed therebetween, said method comprising the steps of:
    a) providing a metal housing layer, a metal constraining layer, and a viscoelastic layer, said metal housing layer having a marginal single layer metal flange portion;
    b) disposing said metal housing layer, said viscoelastic layer, and said metal constraining layer in press means;
    c) urging said metal constraining layer into deforming contact with said metal housing layer by said press means while said viscoelastic layer is disposed between said metal constraining layer and said metal housing layer to deform at least a significant portion of at least one of said metal layers into a three-dimensional shape;
    d) providing from said metal flange portion a single layer metal flange on the enclosure;

thereby producing a sound-damped automotive enclosure having a single layer metal flange extending from said metal housing layer, said metal constraining layer and said viscoelastic layer closely conforming to the shape of those portions of the metal housing layer to which they are adjacent, the viscoelastic layer being capable, through effective solid contact with areas of said metal layers, of providing effective sound-dampening of noise associated with the enclosure.

2. The method of claim 1, further comprising the step of affixing a second metal constraining layer to said metal housing layer with a second viscoelastic layer disposed therebetween.

3. The method of claim 1, wherein said metal housing layer and said metal constraining layer disposed in said press means are sheets.

4. The method of claim 1, wherein said viscoelastic layer is comprised of a urethane polymer and an olefin polymer.

5. The method of claim 1, further comprising the step of providing a pattern of ridges or raised portions in said metal constraining layer to stiffen said metal constraining layer.

6. The method of claim 1, wherein a portion of said press means comprises fluid-forming press means.

7. The method of claim 1, wherein said metal constraining layer and said viscoelastic layer each have a corresponding cutout.

8. The method of claim 1, said metal constraining layer and said metal housing layer being deformed simultaneously by said press means.

9. The method of claim 1, said metal constraining layer and said metal housing layer being, prior to stamping, different in thickness.

10. The method of claim 1, wherein said metal layers are mechanically attached after said deforming operation.

11. The method of claim 1, wherein the single layer metal flange is adapted for mounting the enclosure to an engine block.

12. A method according to claim 1, said viscoelastic layer containing a blowing agent prior to said urging step, further comprising a step of heating the viscoelastic layer to activate the blowing agent therein.

13. A method according to claim 1, the viscoelastic layer being provided with supplemental holding means to assist in holding the metal layers together after said deforming operation.

14. The method of claim 1, wherein said viscoelastic layer is disposed in step (b) without a blowing agent.

15. The method of claim 14, further comprising a step of heating the enclosure to permit the viscoelastic layer to flow into and fill open space between the metal layers.

16. The method of claim 9, said metal constraining layer being steel from 0.010 to 0.032 inches thick before stamping, and said metal housing layer being steel from 0.030 to 0.060 inches thick before stamping.

17. The method of claim 1, wherein said metal constraining layer is formed with said press means.

18. A method according to claim 17, said metal housing layer having previously been deformed into the shape of an oil pan before said metal constraining layer is deformed during said urging step.

19. The method of claim 17, wherein in step (c), said metal housing layer is drawn with said press means.

20. The method of claim 19, wherein a substantial portion of said metal constraining layer is formed while said metal housing layer is drawn.

21. The method of claim 17, wherein said viscoelastic layer is adhered to said metal constraining layer when said metal constraining layer is formed with said press means.

22. The method of claim 21, wherein said adherence is by tabs.

23. The method of claim 21, wherein said adherence is by gluing means.

24. The method of claim 21, wherein said adherence is by heat-bonding.

25. The method of claim 1, wherein the sound-dampened automotive enclosure thus produced is an oil pan which has an inside and an outside and said metal constraining layer and said viscoelastic layer are on the inside of said oil pan.

26. The method of claim 25, wherein the metal constraining layer and viscoelastic layer closely conform to the shape of those portions of the metal housing layer to which they are adjacent, said portions being preselected as those subject to the most vibration when said enclosure is utilized as an automobile oil pan.

27. The method of claim 25, wherein the single layer metal flange is adapted for mounting the oil pan to an engine block.

28. The method of claim 10, wherein said visco-elastic layer is comprised of a urethane polymer and an olefin polymer.

29. The method of claim 28, wherein said viscoelastic layer is disposed in step (b) without a blowing agent.

* * * * *